INVENTOR
HERMANN CASPARIS

_United States Patent Office_ 3,458,898
Patented Aug. 5, 1969

3,458,898
APPARATUS FOR THE PRODUCTION OF ORTHOPEDIC FOOTREST OR SUPPORT
Hermann Casparis, Zelglistrasse 3, Forch, Switzerland
Filed Jan. 24, 1966, Ser. No. 522,472
Claims priority, application Germany, Jan. 28, 1965,
C 34,964
Int. Cl. B29d *31/00;* A43d *35/00*
U.S. Cl. 18—5.1                                     13 Claims

ABSTRACT OF THE DISCLOSURE

A novel apparatus for manufacturing orthopedic foot supports is disclosed. The novel apparatus comprises, in combination, flexible cushion means, a layer of heat-insulating material overlying the flexible cushion means and adapted to serve as a support for a thermo-plastic plate member. A further layer of heat-insulating material provides a protective means for the foot which is to be placed upon the plate member, the further layer being located above the first layer. Means are also included for heating the thermo-plastic plate member.

---

The present invention has reference to an improved apparatus for the production of orthopedic footrests or supports formed of thermoplastic material.

As a background for facilitating an understanding of the instant invention, it should be appreciated that methods for the production of footrests can be classified as follows:

(1) A method wherein a plaster cast or impression is taken of the deformed foot which has been brought into corrected position and which then during the production of the support serves as the negative mold.

(2) A method wherein under the supervision of an orthopedist the foot support is produced in accordance with the measurements of the deformed foot of the patient, and this technique requires the presence of the latter.

(3) The mass production of series-produced foot supports of different types and sizes which are not individually fitted.

The first two aforementioned techniques each possess the disadvantage that they require extremely skilled and trained personnel, demand a large expenditure of time both from the manufacturer as well as from the patient and consequently are relatively expensive. The third, and most widely employed, method in which there is required expensive press and mold apparatuses results in a relatively inexpensive product. However, since the sale thereof is generally carried out by reasonably untrained persons who are not always sufficiently informed about the subject matter, there continually exists the danger that supports will be sold which do not fit properly, and this can result in damage to the feet of the patient.

Accordingly, it is a primary object of this invention to provide an improved, and apparatus for the relatively simple production of orthopedic footrests or supports without there resulting any errors which could be harmful to the patient or user.

Another, more specific object of this invention is directed to an improved apparatus for carrying out an extremely simplified production of foot supports which are accurately formed to the individual dimensions of the foot of the user in a relatively easy, quick and inexpensive manner.

It is particularly to be mentioned that, by virtue of the inventive apparatus it is possible to manufacture footrests or supports in the shortest possible time, and specifically it is possible to start from:

(1) Flat plates or sheets of thermoplastic pre-cut to different sizes, for example a well known plastic material commercially sold under the trademark "Plexiglas,"

(2) Rectangular, flat plates or sheets of dissimilar size and surface formed of thermoplastic and not pre-cut, and (3) Pre-cut, pre-formed foot supports formed of thermoplastic which, for example, have been produced by means of the inventive apparatus or in mass production and which are fitted by re-forming or specially fitted to the patient in question.

The inventive apparatus also renders it possible to quickly and reliably take an impression of a normal or deformed foot, or a part thereof, upon a plate formed of synthetic material or plastic, so that there is thereby obtained a negative mold by means of which there can be produced footrests of other materials which are usually employed for this purpose, for instance metal, leather, wood, etc.

The method carried out by the inventive apparatus for the manufacture of orthopedic footrests or supports is characterized by the features that, a thermoplastic plate is heated into a plastic deformable condition, thereafter placed upon a cushion which is protected by a flexible layer formed of heat-insulating material, then the foot in corrected position is placed upon the plate which is covered by a further flexible layer of heat-insulating material and this plate is thereby deformed to partake the corrected form of the sole of the foot, whereby the cushion which has been simultaneously elastically deformed presses the plate against the sole of the foot, and that finally the plate which is maintained by the foot in the deformed shape is brought into solidified condition by cooling.

The apparatus for the performance of this method, according to the invention, is characterized by the features of a resilient or flexible cushion as well as a layer of heat-insulating material covering the cushion and serving as a support for the heated plate. There is also provided a further layer formed of the aforementioned material which is above the first layer and serves as protection for the foot which is to be placed upon the plate, and means for heating this plate.

Other features, objects and advantages of the invention will become apparent by reference to the following detailed description and drawings wherein like reference characters have been used for substantially the same or analogous elements throughout the various embodiments, and in which:

FIGURE 1 schematically illustrates a cross-sectional view of a preferred embodiment of apparatus for the production of orthopedic footrests or supports;

Figure 4:
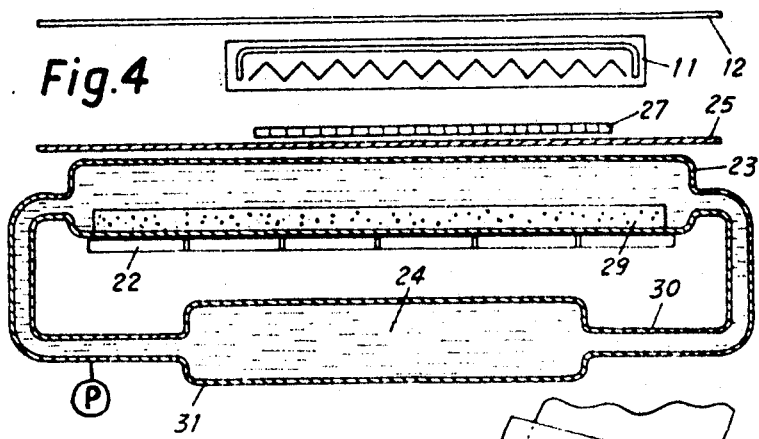
Figure 5:
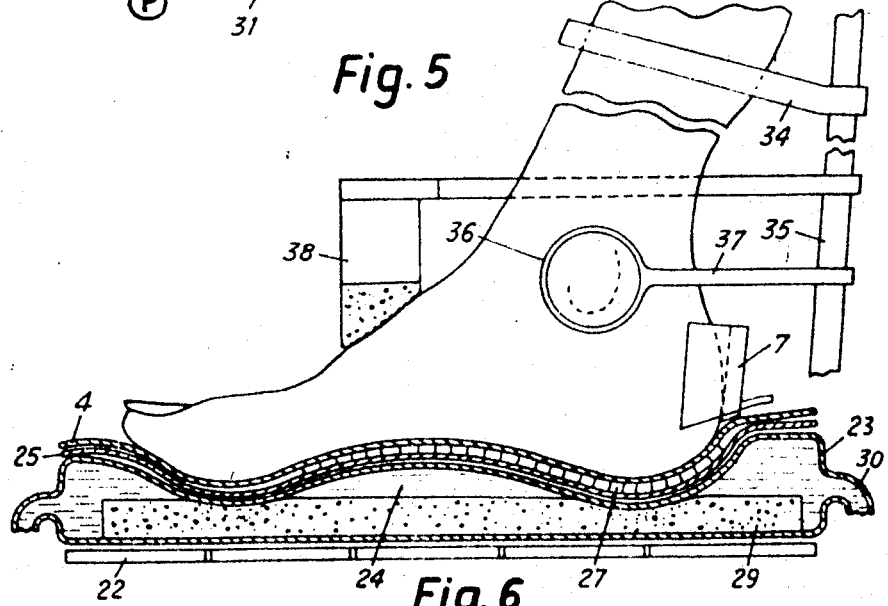
Figure 6:
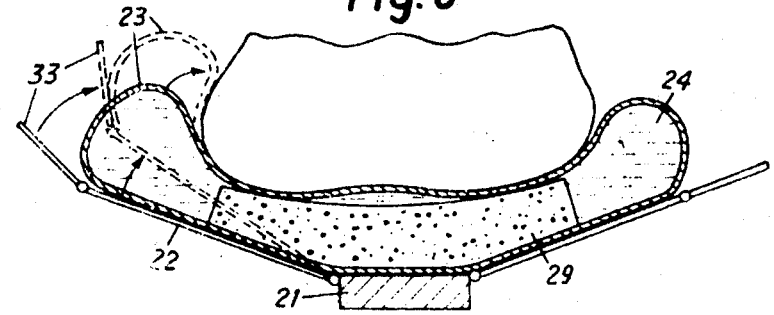

FIGURE 4 schematically illustrates in cross-section details of a modified form of cushion arrangement filled with an incompressible liquid and having connected thereto a liquid reservoir;

FIGURE 5 schematically illustrates a cross-sectional view of the cushion arrangement of FIGURE 4 provided with additional bracing means for the foot; and FIGURE 6 is a cross-sectional view of a further embodiment of cushion arrangement, similar to that of FIGURE 4, but provided with a modified form of base plate.

Figure 1:
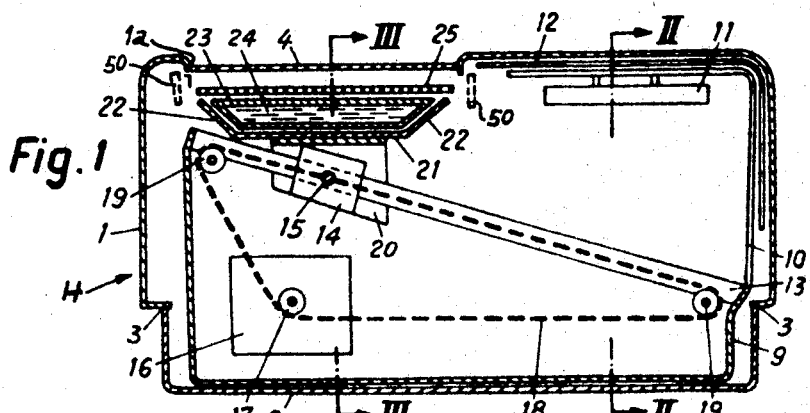
Figure 2:
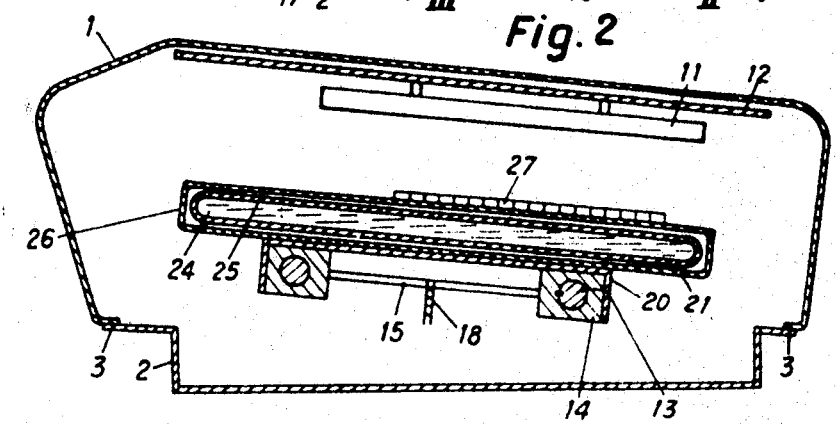
FIGURE 2 is a cross-sectional view of the inventive apparatus of FIGURE 1 with the cushion arrangement in lowered position and taken along the line II—II thereof.
Figure 3:
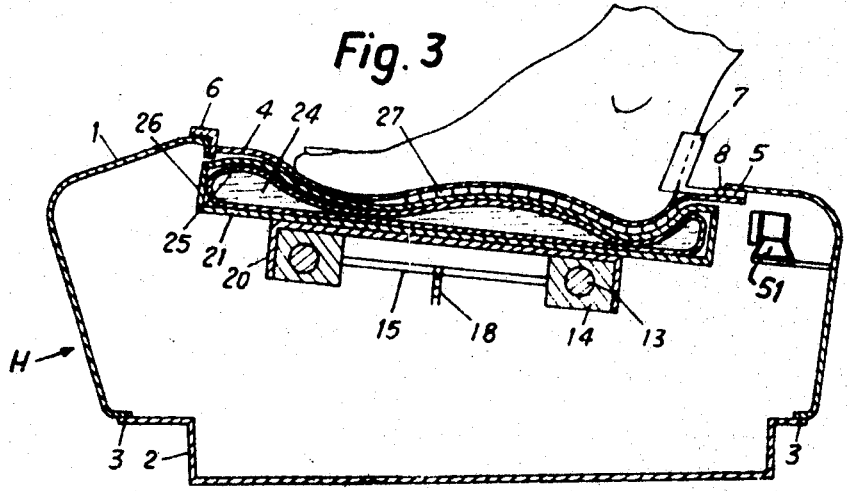
FIGURE 3 is a cross-sectional view of the inventive apparatus of FIGURE 1, taken along the line III—III thereof.

Describing now the drawings and initially considering the embodiment of inventive apparatus illustrated by way of example in FIGURES 1 to 3, it will be seen that a housing H incorporating an upper housing portion 1 seated upon a support or base plate 2 serves to house the components of the apparatus. Both of these housing portions 1 and 2 are held together at the locations designated by reference character 3 by means of suitable, non-illustrated screws or hinge connections or any other suitable expedients. It will be recognized that the upper housing portion 1 possesses an opening 1a extending transversely across the housing H and which is closed by means of a suitable heat-insulating, elastic membrane 4. One side of the membrane 4 is connected at location 5 (FIGURE 3) with the upper housing portion 1. The other side of the membrane is provided with a handgrip 6 which renders it possible to lift this membrane 4 so as to provide access with the interior of the housing H by means of the housing opening 1a. A heel support 7 is secured to the upper housing portion 1 by means of a suitable hinge connection 8. When the apparatus is not in use, this heel support 7 bears against the flexible membrane 4. Upon raising or lowering the membrane 4 the heel support 7 is moved in unison.

Moreover, a frame 9 is connected with the housing base plate 2 by welding, screws, or rivet connection. In the exemplary embodiment, heating means, which is here shown to be an electric radiant heating device 11, is suspended by a support 10 at the frame 9. Additionally, a heat reflector 12 is provided between the heating device 11 and the upper housing portion 1.

Frame 9 also carries two guide rails 13 which are inclined with respect to the horizontal and disposed in substantial parallelism with regard to one another. A respective slide or glide block 14 is displaceably mounted upon each of these guide rails 13. A connecting rod or bar 15 operatievly connects both of the slide blocks 14 with one another. The thus interconnected slide blocks 14 build a slidable carriage unit which carries a molding device. Inclination of the guide rails 13 is advantageously chosen such that the slide carriage unit in the one terminal position beneath the opening 1a in the upper housing portion 1 is located higher than in the other terminal position (FIGURE 2) beneath the radiant heating device 11. This slidable or slide carriage unit, further details of which will be considered shortly hereinafter, is driven by means of a suitable electric motor 16 located beneath the guide rails 13, and specifically, the driving connection is provided by a gear 17 meshing with an endless chain 18 connecting with the connecting rod 15. This endless chain 18 is guided at the ends of the guide rails 13 by means of deflecting rollers 19. Of course, in lieu of the endless chain with sprocket wheels there could also be employed as the transmission unit a spindle arrangement or any other equivalent structure.

A substantially U-shaped flexed plate 20 is connected with the slide blocks 14 and serves as support for a base plate 21. The latter possesses two side walls 22 at two oppositely located sides thereof and these side walls 22 are advantageouly adjustable with regard to their inclination with respect to the base plate 21. Adjustment can be undertaken by manually bending the marginal edges of the base plate 21 or by means of arresting hinge joints for instance. Moreover, the elements 20 and 21 can also be formed of one piece.

Cushion means 23 filled with a suitable incompressible fluid medium 24 is located upon the base plate 21 and its side walls 22. Such hollow cushion means 23 is formed of a suitable heat-resistant material and its form is optional, in other words, could be quadrangular or oval for instance. The fluid medium 24 within the cushion means 23 can remain in the liquid phase throughout the entire working temperature range. However, the possibility also exists of selecting a material which, upon cooling, solidifies to a solid body and only upon renewed heating again becomes liquid.

It is also to be understood that the central region of the cushion means 23 bears upon the base plate 21, whereas the marginal edges nest against the displaceable side walls 22. The purpose of such arrangement is that the surface of the cushion means 23 is freely movable, in other words need not take up any tension. Now, if a pressure is exerted upon the central region of the cushion means 23 and the fluid medium 24 located therein, then by virtue of the incompressibility of this fluid medium it is displaced into the marginal regions of the aforesaid cushion means and which bear against the inclined side walls 22. Hence, the fluid medium is displaced from the locations of greater pressure to those where there does not prevail any or only a very small pressure upon the cushion means and the contained fluid medium.

A flexible reflector membrane or layer 25 is provided above the cushion means 23 and which, for instance, is formed of a heat-resistant fiberglass fabric or of another heat-insulating material. This membrane or layer 25 is fastened to supports 26 arranged at one of the plates 20 or 21. Apart from this, the possiblity also exists of fastening the membrane 25 directly to the cushion means 23.

In the event that the arrangement of the apparatus is undertaken such that the cushion means 23 is not displaceable, then it would be possible to provide suitable heating elements, e.g. radiant heating elements 50 laterally thereof, as such has been shown schematically in phantom lines in FIGURE 1. Moreover, to assist in the cooling of the heated thermoplastic plate member 27 which is deformed by the foot, in the manner to be considered hereinafter, suitable means such as a ventilator 51 (FIGURE 3) could be provided within the housing H for the purpose of generating an air current.

For the production of a footrest or support one proceeds as follows:

The upper membrane or layer 4 is removed and a plate member formed of thermoplastic material is placed upon the reflector membrane or layer 25. Now the travelling structural unit consisting of the elements 20 to 25 is moved to the right of FIGURE 1 until it arrives at the lower terminal position beneath the heating element or device 11, as such is depicted in FIGURE 2. This heating element 11 is then switched on so that the plate member 27, from which the footrest or support is to be formed, is heated up to the softening point. Now the drive motor 16 is again switched on and the movable structural unit displaced beneath the memberane 4. At this time the foot of the patient can be placed in corrected position upon the aforesaid membrane 4. Owing to the incompressibility of the fluid medium 24 in the cushion means 23, the heated plate member 27 of thermoplastic material is pressed against the foot and assumes its form. The foot is held in this position for such length of time until the already formed footrest has cooled down by giving off heat to an extent that there no longer need be feared any undesired deformation. After solidification of the plate member 27 the membrane 4 can be removed and the footrest or support can be directly used once it has fully or completely cooled. It is further to be mentioned that it is possible to use for the foot supports thermoplastic materials which become plastic or workable into desired form at a temperature range lying between approximately 130° C. to 150° C., at temperatures therebeneath considerably retain their form, however. By way of example, materials suitable for the manufacture of footrests or supports are, for instance "Plexiglas" and polymethane.

In addition to the described manner of producing footrests or supports, it is also possible to initially manufacture in the aforedescribed apparatus only models of foot supports which are thereafter used for the fabrication of the final footrests which, as heretofore, could be formed of leather with or without a metal insert.

In accordance with the preferred embodiment of inventive apparatus, the steps necessary for the manufacture for the footrests take place essentially automatically. Thus, for example, the procedure for the manufacture of the footrests is triggered by means of a push button which, for instance, is located externally at the housing H. By means of this switch or push button the current circuit for the electric drive motor 16 is closed, whereupon this drive motor displaces the movable structural unit beneath the heating device 11. The motor current circuit is interrupted by any suitable switch contact which stops the movable structural unit in the terminal position beneath the radiant heating device. At the same time, for instance by means of a lever which is located in the path of the movable structural unit, a timing switch is placed into operation which switches in the heating device and retains such in an effectual heating condition for a prescribed period of time. This time span is calculated such that the material of the footrest is heated to an extent that it possesses a sufficient plasticity. Then the electric drive motor 16 is switched in the opposite direction so that the movable structural unit is now displaced to a position beneath the membrane or layer 4. Also in this terminal position, the movable structural unit actuates a suitable terminal switch which shuts down the motor 16. Here again, at the same time a timing switch is triggered which switches in a signal lamp and holds such in energized state for such time as the material of the footrest possesses the required plasticity for forming the footrest. Due to illumination of the signal lamp there is thus indicated that the foot of the patient can be placed upon the diaphragm or membrane 4. After cooling of the footrest and as described heretofore, the diaphragm can be released and the now formed footrest removed. The entire manufacturing procedure can be completed within a few minutes' time.

FIGURE 4 depicts a variant form of the cushion means which can be used in the inventive apparatus. In this case, the cushion means 23 is connected via a conduit 30 with a fluid reservoir 31. By virtue of this measure there is first of all obtained the advantage that the quantity of fluid medium located in the cushion means itself can be changed. In addition to this, the fluid reservoir 31 guarantees for a relatively quick cooling by convection of the fluid medium located within the aforesaid cushion means. If necessary, in one of the two conduits 30 located at opposite ends of the cushion means 23 and communicating with the reservoir 31, there can be provided a suitable pump P (FIGURE 4) for supporting the circulation of the fluid which takes place during temperature equalisation. Furthermore, by means of the reservoir 31 it is possible to vary the pressure of the fluid medium in the cushion means 23, for instance by manually compressing such reservoir at the time that the foot is already placed upon the cushion means. In so doing, the material of the foot support is correspondingly strongly pressed against the foot and thereby partakes of its form. The possibility also exists, of course, of compressing the reservoir electromechanically or in any other appropriate manner. Finally, there will also be recognized by inspecting FIGURE 4 that a stabilisation mat or pad 29 can be provided within the hollow cushion means 23 and the function thereof is to prevent a displacement of both oppositely situated sides of the cushion means, and further, to form a support for the foot. This mat or pad 29 is formed for instance of a light compressible polyurethane foam mass. If desired, a similar foam rubber mass in the form of a pad can also be used with the cushion means of FIGURE 1.

It will be understood that all of the components; of the apparatus of FIGURE 4 for the production of footrests and which are not illustrated therein are identical with the corresponding components of FIGURES 1 to 3 so that no further description thereof would appear to be necessary, nor need they be illustrated in this figure.

As shown in the arrangement of apparatus of FIGURE 5, it is possible to provide such apparatus with guide means and support means for the foot. In addition to the already mentioned heel support 7 it is possible to also provide by way of example guide rails 34 for the calf of the leg at a strut 35, as well as also a foam rubber filled or lined block 38 which firmly holds the foot during solidification of the footrest against the cushion means. In order to fix the foot in a position it has once assumed, it is possible to secure via two rails 37 two eyelets 36 to the strut 35 and which bear against ankles of the foot and hold such in place. All of these holding devices and guide means are advantageously adjustable.

FIGURE 6 depicts a further possible exemplary construction of the base plate 21 and the side walls 22 upon which the hollow cushion means 23, filled with an incompressible medium, bears. In the here illustrated embodiment, flaps 33 are additionally provided at the adjustable side walls 22 which, in turn, are adjustable with respect to their angular position with regard to the side walls 22. These flaps 33 are provided in order, if necessary, to be able to fit the cushion means 23 to the form of strongly deformed feet. As further to be recognized by inspecting FIGURE 6, it is possible to hold the base plate 21 relatively small in size in comparison with the side walls 22, whereby there is also attained a better fitting of the cushion means to the form of the foot.

According to a further non-illustrated embodiment the fluid type or fluid-containing cushion means can be replaced by a cushion means according to FIGURE 4 which, however, only consists of the mat of polyurethane foam, and at such type cushion means there is connected via a flexible cable or connection a ventilator serving to introduce cooling air. Also this type of cushion means is covered by a reflector membrane.

Naturally, further modifications can be readily undertaken from the illustrated embodiments without departing from the spirit and scope of the invention. For instance, as already mentioned, it is not necessary to have the transport device for the cushion means, in which case the heating elements, such as heating elements 50 of FIGURE 1, would then be arranged laterally of the edges of the membrane 4, whereas the then stationary base plate would be located somewhat lower than in the arrangement of FIGURE 1 so that the radiant action from the sides of the heating elements heats up the cushion means.

As it should now be apparent, the objects initially set forth at the outset of this specification have now been successfully achieved. Accordingly,

What is claimed is:

1. Apparatus for manufacturing orthopedic foot supports comprising, in combination, flexible cushion means, a layer of heat-insulating material overlying said flexible cushion means and adapted to serve as a support for a thermoplastic plate member, a further layer of heat-insulating material providing a protective means for the foot which is to be placed upon the plate member, said further layer being located above said first layer, and means for heating the thermoplastic plate member.

2. Apparatus for manufacturing orthopedic foot supports as defined in claim 1, further including a base plate for supporting said flexible cushion means, said base plate being provided at opposite sides with at least two inclined extending side walls.

3. Apparatus for manufacturing orthopedic foot supports as defined in claim 2, including means cooperating with said inclined side walls for changing the angle of inclination with respect to the body of the base plate.

4. Apparatus for manufacturing orthopedic foot supports as defined in claim 2, further including a housing provided with an opening for receiving the foot, said further layer being located in said opening and providing an elastic membrane, said heating means being a radiant heating device located within said housing, guide track means arranged within said housing for movably supporting said base plate for displacement along said guide track means between two terminal positions, whereby said base plate in one terminal position is disposed beneath said radiant heating device and in the other terminal position beneath said further layer providing said elastic membrane.

5. Apparatus for manufacturing orthopedic foot supports as defined in claim 4, wherein said guide track means incorporates guide rod means, two slide blocks to which said base plate is secured and slidable along said guide rod means, a connecting rod for operably interconnecting said two slide blocks, motor-driven endless chain means operatively connected with said connecting rod, to enable automatic displacement of said base plate from one terminal position to the other.

6. Apparatus for manufacturing orthopedic foot supports as defined in claim 4, wherein said guide track means is inclined such that said base plate in said one terminal position is located lower beneath said radiant heating device than in said other terminal position.

7. Apparatus for manufacturing orthopedic foot supports as defined in claim 1, wherein said flexible cushion means contains a foam rubber mass and a fluid medium.

8. Apparatus for manufacturing orthopedic foot supports as defined in claim 7, further including a reservoir for the fluid medium, at least one conduit connecting said reservoir with said cushion means, so that the quantity of fluid medium within said cushion means can be changed.

9. Apparatus for manufacturing orthopedic foot supports as defined in claim 8, further including ventilator means cooperating with said cushion means for cooling the latter by generating an air circulation in the pores of said foam rubber mass.

10. Apparatus for manufacturing orthopedic foot supports as defined in claim 8, including a pair of conduits connected to opposite sides of said cushion means for communicating the interior of said cushion means with said reservoir, so that after heating of the fluid medium in said cushion means there occurs a heat exchange with the fluid medium in said reservoir to bring about cooling of said cushion means.

11. Apparatus for manufacturing orthopedic foot supports as defined in claim 10, further including a circulating pump connected with at least one of said pair of conduits.

12. Apparatus for manufacturing orthopedic foot supports as defined in claim 1, wherein said heating means comprise radiant heating elements located laterally of said cushion means.

13. Apparatus for manufacturing orthopedic foot supports as defined in claim 1, further including means for generating an air current for cooling the heated thermoplastic plate member.

References Cited

UNITED STATES PATENTS

| | | | |
|---|---|---|---|
| 2,082,451 | 6/1937 | Kivlaham et al. | 18—5.1 |
| 2,333,481 | 11/1943 | Limmer | 18—5.1 |
| 2,581,489 | 1/1952 | Kilham | 18—5.1 |
| 2,996,757 | 8/1961 | Heflin | 18—5.1 |
| 3,309,447 | 3/1967 | Wegley | 264—223 |
| 2,440,508 | 4/1948 | Gould | 18—35 |
| 2,547,419 | 4/1951 | Sugarman | 18—55.1 |

WILBUR L. McBAY, Primary Examiner

U.S. Cl. X.R.

264—223, 322